Sept. 15, 1931.  W. SOUPAL  1,823,006
VALVE
Filed Aug. 8, 1930
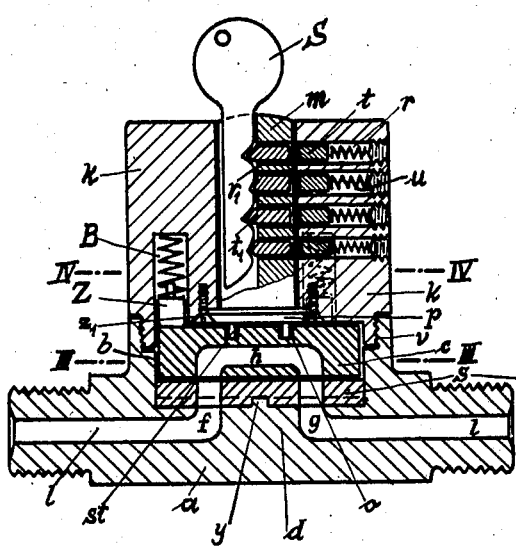
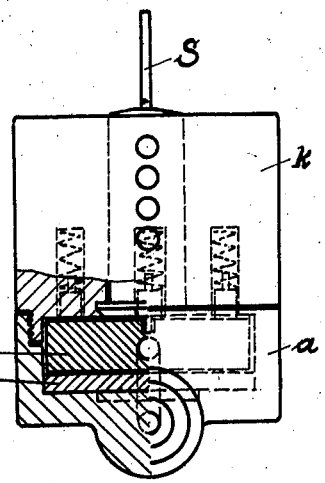
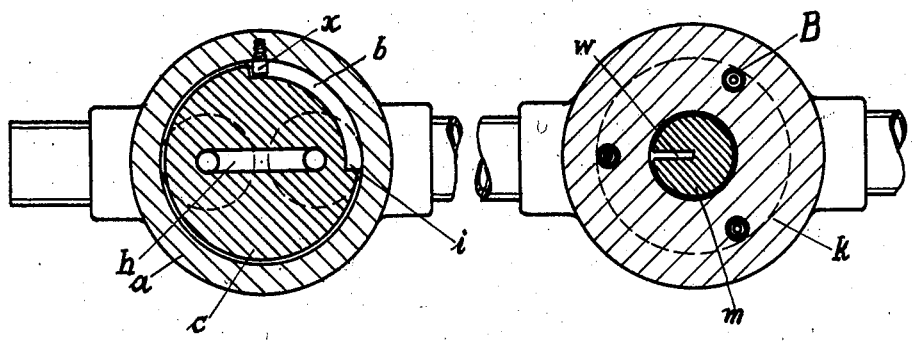
Inventor:
Wilhelm Soupal
by
S. Soupal,
Attorney.

Patented Sept. 15, 1931

1,823,006

UNITED STATES PATENT OFFICE

WILHELM SOUPAL, OF MATZELSDORF, NEAR NEULENGBACH, AUSTRIA

VALVE

Application filed August 8, 1930, Serial No. 474,022, and in Austria May 28, 1930.

Hitherto fluid-tight valves, for instance rotary slide valves with cork or like packing which are used for controlling the fuel supply of motor car engines, could not be locked in the closed position, and for this reason the building in of such valves into the fuel conduit of a motor car engine did not prevent their theft.

The present invention consists in making rotary slide valves adapted to be locked in their closed positions by the provision of a lock connected with the slide valve. The invention further consists in a particular constructional form of a fluid-tight valve by which a reliable locking in the closed position is ensured, dismounting of the parts of the valve casing to enable defective packing parts to be exchanged is rendered possible in the unlocked position only, whilst being impossible in the closed position of the valve, whereby unauthorized starting of the engine or theft of the vehicle is prevented.

Valves for fuel conduits adapted to be locked, are already known. These valves however are not fluid-tight. The difficulties which hitherto prevented reliable locking of fluid-tight valves, are due to the fact that on the one hand the cork or other packing members which are required for keeping the valve tight must be subjected to a certain pressure if they are to pack effectively, whilst on the other hand the members of the lock which are intended to effect the locking of the valve must be positioned exactly relatively to each other and do not permit a play or a relative displacement in the axial direction for the purpose of compressing the packing members, without endangering the precise action of the lock; a further difficulty is due to the fact that as previously mentioned, the owner of the car must have always access to the interior of the valve in order to be able to exchange a packing member subjected to rapid wear, and that consequently, the valve casing must be constructed in two parts which parts however, must be connected together undetachably in the closed position of the valve. The construction forming the subject of the present invention overcomes these difficulties by providing on the one hand means for the obtention of pressure upon the packing disc whilst maintaining axial immobility of the locked parts, this being attained according to the invention by connecting the lock and valve parts so as to couple them for rotation but allowing play in axial direction, and on the other hand by providing in the locking position of the lock also for a locking of the parts of the casing relatively to each other.

The lock used is preferably of the pin-tumbler type or a cylindrical Yale lock which permits of a compact construction and connection with the valve body, the outer lock casing constituting in the form of a sleeve, the cover portion of the valve casing, whilst the central rotary cylinder serves for turning the valve body with which it is loosely coupled in the manner above referred to.

The subject of the invention is shown in a constructional example in the drawings, Fig. 1 showing a vertical section through the valve, the valve being shown in the open position, Fig. 2 is a side view partly in section, Fig. 3 a horizontal section on III—III, Fig. 4 a similar section on IV—IV of Fig. 1.

The valve consists of a two-part valve casing, in the cylindrical recess $b$ of which the rotary slide valve $c$ is rotatably fitted. The conduit bore $l$ does not extend centrally through the valve casing, but the latter has in its core a solid part $d$ and the bore of the conduit is bent at right angles both in front and behind this core piece and terminates in two openings $f$, $g$ in the base of the cylindrical recess $b$ of the valve casing. The slide valve $c$ contains a bore $h$ bent at an angle on both ends, which in the open position of the valve bridges and puts into communication the two openings $f$, $g$. Between the casing and the lower end of the rotary valve lies a plane packing disc $s$ of cork having perforations corresponding to the openings $f$, $g$. The packing disc is provided upon its under side with a recess $y$ which engages a corresponding projection of the seating surface whereby the pack disc $s$ is held in its position against rotation. The lower part of the valve casing is designated by $a$. It possesses an upwardly projecting hollow cylindrical extension $v$ with internal threading. The lock mechanism is constructed as a Yale lock and may be made entirely independently of the valve proper. The lock comprises a cylindrical lock casing $k$, the tumbler cylinder, in which the revolving cylinder $m$ is mounted centrally rotatably and exactly fitting. This cylinder has upon its lower end a conical projection $p$ by means of which it is held axially in the lock casing by means of small screws $z_1$. In the lock casing are provided bores or chambers $r$ for the reception of the tumbler pins $t$ and pressure springs $u$, said bores being closed at the outer end by screw or rivet-heads which are ground down to lie flush with the outer surface of the casing $k$, whilst in the revolving cylinder there are provided the corresponding bores $r_1$ for the reception of the pressure pins $t_1$. The last mentioned bores terminate internally in a central slot $w$ for the reception of the key S. For a purpose to be explained later on, the lock casing possesses also three bores B terminating in the base, in which strong helical springs act upon pressure pins Z which are pressed out downwards and slide upon the surface of the slide valve $c$.

The connection of the lock with the valve to a coherent unit is according to the invention carried out in such a manner that on the one hand the lock casing $k$ constitutes the member covering the valve casing, by being screwed with its reduced end into a cylindrical extension $v$ of the valve casing $a$, and that on the other hand the revolving cylinder $m$ of the lock is coupled with the slide member of the valve as regards rotation so that it constitutes as it were the upper extension pivot of the slide valve, the slide valve being thus adapted to be adjusted by the former and locked by a key S. The pins Z pressing upon the slide effect at the same time the required compression of the cork disc $s$ without any axial displacement of the revolving cylinder being required. The coupling is effected by coupling pins $st$, which are arranged upon the base of the revolving cylinder $m$ and engage corresponding holes $o$ in the slide valve $c$.

The slide valve $c$ is moreover provided peripherally upon an arc of 90° with a recess $i$ in which slides a stop pin $x$ fixed to the casing $a$. The arrangement of the recess and the locking pin is made in such a manner that in the closing position of the valve the pin acts as a stop against the recess and thus prevents effectively any unscrewing of the upper lock casing $k$ in the closed position of the valve. The movement of the slide valve during its transition from the upper into the closed position is simultaneously limited by the stop pin and the recess of the slide valve.

The operation is as follows:

When the valve is in the closed position, and consequently the part $c$ in a position at right angles to that shown in Fig. 1, then the bores $r$, $r_1$ register. The tumbler pins $t$ project into the bores $r_1$ and lock the part $m$ against rotation, and consequently lock the valve $c$ in the closed position. The stop pin contacts with the end of the recess $i$, and as the slide valve is coupled to the revolving cylinder and as the latter is locked by the tumbler pins, unscrewing of the lock casing $k$ from the valve casing $a$ is impossible. If in this position the key S is inserted, it positions by means of the pressure pins $t_1$ the tumbler pins in such a manner that they are just pressed out of the bores $r_1$ and permit rotation of the revolving cylinder $m$ and consequently also of the valve $c$ into the open position shown in Fig. 1. After the completion of this quarter revolution which is limited by the pin $x$ (Fig. 3), the key cannot be withdrawn (withdrawal of the key is only possible in the locked closed position of the valve). The lock casing can be unscrewed from the valve casing $a$ in the open position, if an exchange of the cork packing disc is required.

I claim—

1. The combination of: a fuel conduit; a valve casing portion on said conduit; a resilient valve seat packing in said valve casing portion; a rotary slide valve rotatable upon said resilient packing; a second valve casing portion detachably connected to said first valve casing portion to enable said valve to be inspected; a key operable lock of the tumbler pin type arranged in said detachable casing portion and having a revolving cylinder portion coupled with said valve so as to turn said valve but permit of axial movement of the valve; means for pressing said valve against said packing; and means for preventing detaching of the detachable valve casing portion from the other casing portion in the closed position of the valve.

2. The combination of: a fuel conduit; a valve casing portion on said conduit; a second valve casing portion screwed into the first valve casing portion; a rotary slide valve; a key operated lock of the tumbler pin type arranged within the detachable valve casing portion and having a key operated revolving cylindrical member said cylindrical member being coupled to the rotary slide valve, said lock being arranged to lock the said valve in the closed position; and means for preventing unscrewing of the second valve casing portion from the first valve casing portion in the closed position of the valve.

3. The combination of: a fuel conduit; a valve casing portion upon said conduit; a second valve casing portion adapted to be screwed into said first valve casing portion; said first and second valve casing portions having a cylindrical cavity; a resilient valve seat in the first valve casing portion; a rotary slide valve arranged in the cylindrical cavity of the two valve casing portions and slidable upon said resilient valve seat; means for resiliently pressing said rotary slide valve against said resilient valve seat, said means being arranged in the second valve casing portion; a lock of the tumbler pin type arranged in said second valve casing portion and having a central revolving cylindrical member adapted to be operated by a key, said revolving cylindrical member being so coupled with said rotary valve as to carry same peripherally but permit axial movement of the valve independent of said cylindrical member; said rotary slide valve having a peripheral groove and said detachable valve casing portion having a pin engaging said groove, for the purpose of limiting the rotary movement of the valve and preventing unscrewing of the removable valve casing portion in the closed condition of the valve.

Signed at Vienna, Austria, this 24th day of July, 1930.

WILHELM SOUPAL.